Patented Feb. 12, 1946

2,394,688

UNITED STATES PATENT OFFICE 2,394,688

METHOD OF DYEING

Karl Heyman, Montclair, N. J., assignor to American Viscose Corporation, Wilmington, Del., a corporation of Delaware No Drawing. Application January 7, 1944, Serial No. 517,432

16 Claims. (Cl. 8—55)

This invention relates to improvements in methods of dyeing yarns and other shaped articles comprising materials that are not readily permeable to water. More particularly, the invention relates to improvements in methods of dyeing yarns and other shaped articles comprising vinyl polymers, such as polymers of vinyl chloride and copolymers of vinyl acetate with vinyl chloride.

This application is a continuation in part of my applications Serial Nos. 319,018, filed February 15, 1940, and 322,844, filed March 7, 1940, which are in turn continuations in part of Serial No. 311,109, filed December 27, 1939.

Materials that are not readily permeable to water can not be satisfactorily dyed by the ordinary dyeing procedure used in dyeing cotton, wool, natural silk and regenerated cellulose. When ordinary methods of dyeing are attempted the dye either does not penetrate the material and no dyeing is effected or when dyeing is effected the color is not fast and leaches out.

Yarns and other shaped articles, such as those of cellulose acetate, which are not readily permeable to water have been dyed when treated with a liquid swelling agent, such as alcohol, acetone or acetic acid. The swelling agent apparently forms or opens pores in the material into which the dye penetrates. There are certain objections to the use of liquid swelling agents. Generally a large amount of swelling agent is required. Also the swelling agent has a tendency to weaken the yarn or shaped article.

I have discovered that yarns and other shaped articles comprising vinyl polymers, such as polymers of vinyl chloride and copolymers of vinyl acetate with vinyl chloride, can be successfully dyed with suspension dyestuffs when the dyeing operation is carried out with aqueous suspensions of the dyestuffs in the presence of certain normally solid water-insoluble organic compounds which have a solubility in the vinyl polymer of 2% or greater under the conditions at which the dyeing is carried out. By the term suspension dyestuffs is meant water-insoluble dyestuffs of the type applicable to cellulose acetate from a dispersion (insoluble anthraquinone and azo dyes) sometimes referred to as dispersol dyes, and the dyestuffs referred to hereinafter in the examples by their trade names, are of this type. The compounds which are referred to as assistants include:

Diphenyl
Naphthalene
Phenanthrene
a-Naphthol
b-Naphthol
Thio-b-naphthol
2,4-dichloro-a-naphthol
2,4-dibromo-a-naphthol
o-Hydroxydiphenyl
2-chloro-6-phenylphenol
4-chloro-6-phenylphenol
2-chloro-4-phenylphenol
2-bromo-4-phenylphenol
o-Cyclohexylphenol
p-Chlorothymol
2,4-dichloroaniline
2,5-dichloroaniline
a-Naphthylamine
b-Naphthylamine
Phenyl-a-naphthylamine
Phenyl-b-naphthylamine
o-Aminodiphenyl
Fluorenone
8-hydroxyquinoline
Dibenzyl succinate
p-Aminodiphenyl
N,N-diphenyl ethyl carbamate
b-Naphthonitrile
p-Chlorobenzaldehyde
2,4-dimethoxybenzaldehyde
p-Dimethylaminobenzaldehyde
o-Hydroxyacetophenone
Benzophenone
p-Hydroxybenzophenone
Methyl-b-naphthylketone Camphor
Benzalacetone
Anisalacetone
Benzoylacetone
Benzalacetophenone
1-hydroxy-2-acetonaphthone
p-Methoxybenzophenone
Benzil
Diphenyltriketone
Dibenzoylmethane
Desoxybenzoin
Benzhydrol
Phenylbenzylcarbinol
Fluorenyl alcohol
b,b'-Diphenoxydiethylether
Methyl-p-bromobenzoate
Diphenyl phthalate
b-Naphthyl acetate
Phenyl glycine ethylester
Diphenyl carbonate
Di-o-cresyl carbonate
a-Naphthyl acetate
Ethylene dibenzoate
Dicyclohexyl phthalate
Phenyl benzoate
p-Cresyl benzoate
p-Methoxydiphenyl
Benzyl-a-naphthylether
b-Naphthylmethylether
p-Methoxybenzophenone
Benzoic anhydride
2,4,6 tribromophenyl acetate
o-Diphenyl acetate
Glycerol tribenzoate
Dibenzyl phthalate
m-Cresyl benzoate In carrying out my improved method of dyeing an aqueous suspension containing a single assistant or several assistants together may be used. The assistant is, for example, dissolved in a suitable solvent, such as alcohol, and the resulting solution and a suitable dispersing agent, such as that known in the trade as Igepon T, are added to the aqueous dye bath containing the suspension dyestuff. The assistant is thus precipitated in the dye bath in colloidal or very finely divided form. When amino compounds are used as assistants they may be dissolved in an acid solution and precipitated and dispersed in an alkaline dye bath. Phenols may be dissolved in an alkaline solution and precipitated and dispersed in an acid dye bath. The yarn or shaped article to be dyed is then treated with the dye bath containing the assistant in any conditional manner. This procedure may be followed using various quantities of dyestuff and assistants with different dye bath ratios and temperatures of the dye baths depending upon the character of the material being dyed and the type of dyeing that is being carried out. A satisfactory procedure is one in which the dye bath ratio is 1:30 and contains 1.5% suspension dyestuff with 5% or less of the solid water-insoluble assistant based on the weight of the yarn or shaped article to be dyed. A suitable dye bath temperature is about 50° C. and the duration of the dyeing operation one hour. Other temperatures may also be used provided the temperature does not exceed the shrinkage temperature of the resin article being dyed.

My invention may also be carried out by preliminarily applying the assistant from suspension directly to the yarn or shaped article. When the yarn or shaped article is thereafter immersed in the dye bath, the assistant aids the action of the dye bath on the yarn or shape in the same manner as when it has been added to the dye bath.

Instead of using either of the above methods, I may incorporate the assistant directly within the vinyl polymers before the yarn or other shaped article is formed. The yarn or shaped article containing the assistant is treated with the dye bath (to which no solid assistant need be added) in the ordinary manner.

No satisfactory explanation for the effectiveness of the solid substances as dyeing assistants has been found. They are effective in much smaller amounts than the liquid swelling agents heretofore used to assist penetration of the resin mass being dyed, about half to one fourth as much or even less of the solid assistants being capable, in most cases, of producing a given dyeing effect. They exert relatively little if any swelling action upon the mass being dyed. Instead of being softened and weakened by subjection to the dye bath as in the case of the liquid swelling agents heretofore used, vinyl resin fibers immediately after removal from the dye bath show no appreciable softening and often have a harsh hand. The effectiveness does not appear to depend on melting of the solid assistant during dyeing, the dyeing being assisted to approximately the same extent regardless of whether the temperature of the dye bath is above or below the melting point of the assistant. It is surprising and unpredictable that a solid material even in colloidally dispersed condition, would assist penetration of a resin by an insoluble dyestuff. Besides increased efficiency as compared to liquid swelling agents, the solid dyeing assistants of the present invention are more reliable than liquid swelling agents in that higher temperatures (that is, temperatures more closely approaching the shrinkage temperature of the resin) can be used without danger of deleteriously affecting the resin mass, such as by softening, weakening, distorting, or shrinking the mass.

The following examples are illustrative of the invention:

*Example 1.*—Yarns comprising copolymers of vinyl acetate and vinyl chloride were dyed in dye baths having a dye bath ratio of 1:30 and containing 1.5% suspension dyestuff and 5% b-Naphthol based on the weight of the yarn. The temperatures of the dye baths were 60° C. and the duration of the dyeing operation one hour. The dyestuffs that were used were Cibacete Orange 2R
 Cibacete Scarlet G
 Acele Violet B
 Acele Yellow 3G A dye bath was also used with Cibacete Scarlet G 1% and Acele Violet B 1% as the dyestuff.

*Example 2.*—Yarns comprising copolymers of vinyl acetate and vinyl chloride were dyed in dye baths having a dye bath ratio of 1:30 and containing 1.5% suspension dyestuff and 5% p-Dimethylamino-benzaldehyde based on the weight of the yarn. The temperatures of the dye baths were 60° C. and the duration of the dyeing operation one hour. The dyestuffs that were used were Celliton Red Violet RR
 Phenacyl Navy Blue PV
 Phenacyl Red R
 Celutate Brill. Blue B
 Cibacete Rubine BS
 Artisil Direct Yellow 3GP

*Example 3.*—Yarns comprising copolymers of vinyl acetate and vinyl chloride were dyed in dye baths having a dye bath ratio of 1:30 and containing 1.5% suspension dyestuff and 1.5% Benzophenone based on the weight of the yarn. The temperatures of the dye baths were 60° C. and the duration of the dyeing operation one hour. The dyestuffs that were used were Celliton Fast Pink BA
 Acele Scarlet G
 Calconese Orange 3RC
 Cibacete Violet B
 Celutate Fast Blue GL
 Artisil Direct Yellow 3G ex.
 Phenacyl Red R

*Example 4.*—Yarns comprising copolymers of vinyl acetate and vinyl chloride were dyed in dye baths having a dye bath ratio of 1:30 and containing 1.5% suspension dyestuff and 5% o-Hydroxydiphenyl based on the weight of the yarn. The temperatures of the dye baths were 60° C. and the duration of the dyeing operation one hour. The dyestuffs that were used were Celliton Pink RF
 Celliton Red BR
 Celliton Orange 3RN
 Cibacete Yellow 2RN
 Celliton Fast Yellow GRA
 Cibacete Yellow 5G
 Cibacete Brill. Blue BGG
 Celliton Fast Blue FFRS
 Celliton Discharge Violet B
 Cibacete Discharge Violet 5R
 Camacyl Brill. Green B
 Phenacyl Red R
 Cibacete Violet B
 Artisil Direct Yellow 3GP ex. conc.
 Celliton Fast Brown 5RA

*Example 5.*—Yarns comprising copolymers of vinyl acetate and vinyl chloride were treated with a bath in a ratio of 1:30 containing 5% o-Hydroxydiphenyl based on the weight of the yarn at a temperature of 60° C. and for a period of one-half hour. The yarns so treated were then dyed by immersing in dye baths having a dye bath ratio of 1:30 and containing 1.5% suspension dyestuff based on the weight of the yarn. The temperatures of the dye baths were 60° C. and the duration of the dyeing operation one hour. The dyestuffs that were used were

- Camacyl Brill. Green B
- Phenacyl Red R
- Cibacete Violet B
- Artisil Direct Yellow 3GP ex. conc.
- Celliton Fast Brown 5RA While preferred assistants and procedures have been shown it is to be understood that changes and variations may be made without departing from the spirit and scope of the invention as defined in the appended claims.

I claim:

1. A method of dyeing yarns and other shaped articles comprising vinyl polymers, comprising the step of treating the yarn or shaped article with an aqueous dye bath containing a suspension dyestuff, in the presence of a water-insoluble, normally solid organic compound selected from the group consisting of a-naphthol, b-naphthol, thio-b-naphthol, 2.4-dichloro-a-naphthol, 2.4-dibromo-a-naphthol, o-hydroxydiphenyl, 2-chloro-6-phenylphenol, 4-chloro-6-phenylphenol, o-cyclohexylphenol, p-chlorothymol, 2-chloro-4-phenylphenol, and 2-bromo-4-phenylphenol.

2. A method of dyeing yarns and other shaped articles comprising copolymers of vinyl acetate and vinyl chloride, comprising the step of treating the yarn or shaped article with an aqueous dye bath containing a suspension dyestuff, in the presence of a water-insoluble, normally solid organic compound selected from the group consisting of a-naphthol, b-naphthol, thio-b-naphthol, 2.4-dichloro-a-naphthol, 2.4-dibromo-a-naphtol, o-hydroxydiphenyl, 2-chloro-o-phenylphenol, 4-chloro-o-phenylphenol, o-cyclohexylphenol, p-chlorothymol, 2-chloro-4-phenylphenol, and 2-bromo-4-phenylphenol.

3. A method of dyeing yarns and other shaped articles comprising vinyl polymers, comprising the step of treating the yarn or shaped article with an aqueous dye bath containing a suspension dyestuff and a water-insoluble, normally solid organic compound selected from the group consisting of a-naphthol, b-naphthol, thio-b-naphthol, 2.4-dichloro-a-naphthol, 2.4-dibromo-a-naphthol, o-hydroxydiphenyl, 2-chloro-o-phenylphenol, 4-chloro-o-phenylphenol, o-cyclohexylphenol, p-chlorothymol, 2-chloro-4-phenylphenol, and 2-bromo-4-phenylphenol dispersed in the dye bath.

4. A method of dyeing yarns and other shaped articles comprising copolymers of vinyl acetate and vinyl chloride, comprising the step of treating the yarn or shaped article with an aqueous dye bath containing a suspension dyestuff and a water-insoluble, normally solid organic compound selected from the group consisting of a-naphthol, b-naphthol, thio-b-naphthol, 2.4-dichloro-a-naphthol, 2.4 dibromo-a-naphthol, o-hydroxydiphenyl, 2-chloro-6-phenylphenol, 4-chloro-6-phenylphenol, o-cyclohexylphenol, p-chlorothymol, 2-chloro-4-phenylphenol, and 2-bromo-4-phenylphenol dispersed in the dye bath.

5. A method of dyeing yarns and other shaped articles comprising vinyl polymers, comprising the step of treating the yarn or shaped article with an aqueous dye bath containing a suspension dyestuff in the presence of o-cyclohexylphenol.

6. A method of dyeing yarns and other shaped articles comprising vinyl polymers, comprising the step of treating the yarn or shaped article with an aqueous dye bath containing a suspension dyestuff in the presence of o-hydroxydiphenyl.

7. A method of dyeing yarns and other shaped articles comprising vinyl polymers, comprising the step of treating the yarn or shaped article with an aqueous dye bath containing a suspension dyestuff in the presence of thio-b-naphthol.

8. A method of dyeing yarns and other shaped articles comprising copolymers of vinyl acetate and vinyl chloride, comprising the step of treating the yarn or shaped articles with an aqueous dye bath containing a suspension dyestuff in the presence of o-cyclohexylphenol.

9. A method of dyeing yarns and other shaped articles comprising copolymers of vinyl acetate and vinyl chloride, comprising the step of treating the yarn or shaped article with an aqueous dye bath containing a suspension dyestuff in the presence of o-hydroxydiphenyl.

10. A method of dyeing yarns and other shaped articles comprising copolymers of vinyl acetate and vinyl chloride, comprising the step of treating the yarn or shaped article with an aqueous dye bath containing a suspension dyestuff in the presence of thio-b-naphthol.

11. A method of dyeing yarns and other shaped articles comprising vinyl polymers, comprising the step of treating the yarn or shaped article with an aqueous dye bath containing a suspension dyestuff and o-cyclohexylphenol dispersed in the dye bath.

12. A method of dyeing yarns and other shaped articles comprising vinyl polymers, comprising the step of treating the yarn or shaped article with an aqueous dye bath containing a suspension dyestuff and o-hydroxydiphenyl dispersed in the dye bath.

13. A method of dyeing yarns and other shaped articles comprising vinyl polymers, comprising the step of treating the yarn or shaped article with an aqueous dye bath containing a suspension dyestuff and thio-b-naphthol dispersed in the dye bath.

14. A method of dyeing yarns and other shaped articles comprising copolymers of vinyl acetate and vinyl chloride, comprising the step of treating the yarn or shaped article with an aqueous dye bath containing a suspension dyestuff and o-cyclohexylphenol dispersed in the dye bath.

15. A method of dyeing yarns and other shaped articles comprising copolymers of vinyl acetate and vinyl chloride, comprising the step of treating the yarn or shaped article with an aqueous dye bath containing a suspension dyestuff and o-hydroxydiphenyl dispersed in the dye bath.

16. A method of dyeing yarns and other shaped articles comprising copolymers of vinyl acetate and vinyl chloride, comprising the step of treating the yarn or shaped article with an aqueous dye bath containing a suspension dyestuff and thio-b-naphthol dispersed in the dye bath.

KARL HEYMAN.